United States Patent [19]

Taketomo et al.

[11] Patent Number: 4,482,360
[45] Date of Patent: Nov. 13, 1984

[54] POROUS MATERIALS FOR CONCENTRATION AND SEPARATION OF HYDROGEN OR HELIUM, AND PROCESS THEREWITH FOR THE SEPARATION OF THE GAS

[75] Inventors: Eiiji Taketomo; Masami Fujiura, both of Fukuoka, Japan

[73] Assignee: Nippon Steel Corporation, Tokyo, Japan

[21] Appl. No.: 498,174

[22] Filed: May 25, 1983

[30] Foreign Application Priority Data

May 29, 1982 [JP] Japan ............................ 57-90500
Jul. 2, 1982 [JP] Japan ............................ 57-113988

[51] Int. Cl.$^3$ ............................................. B01D 53/22
[52] U.S. Cl. ................................... 55/16; 55/69; 55/158
[58] Field of Search ................ 55/16, 158, 68, 69; 165/31

[56] References Cited

U.S. PATENT DOCUMENTS

| 2,980,532 | 4/1961 | Martensson et al. | 55/16 X |
| 3,100,868 | 8/1963 | McAfee, Jr. | 55/16 X |
| 3,184,899 | 5/1965 | Frazier | 55/16 |
| 3,241,298 | 3/1966 | Pierce | 55/16 X |
| 3,567,666 | 3/1971 | Berger | 55/158 X |
| 3,651,618 | 3/1972 | Klein et al. | 55/16 |
| 4,239,507 | 12/1980 | Benoit et al. | 55/16 |
| 4,427,424 | 1/1984 | Charpin et al. | 55/158 |

FOREIGN PATENT DOCUMENTS

| 31272 | 7/1981 | European Pat. Off. | 55/16 |
| 99078 | 8/1978 | Japan | 55/16 |
| 119420 | 9/1980 | Japan | 55/16 |

Primary Examiner—Robert Spitzer
Attorney, Agent, or Firm—Cushman, Darby & Cushman

[57] ABSTRACT

A porous material for use for separation of gases having a molecular weight not larger than 4, such as hydrogen or helium in a high concentration from a mixture gas containing such gases, comprising not less than 50% of pores having a diameter ranging from 110 to 160 Å with respect to the total pore volume, said pore diameter being determined by nitrogen adsorption measurement.

17 Claims, 3 Drawing Figures

POROUS MATERIALS FOR CONCENTRATION AND SEPARATION OF HYDROGEN OR HELIUM, AND PROCESS THEREWITH FOR THE SEPARATION OF THE GAS

BACKGROUND OF THE INVENTION

1. Field of the Invention:

The present invention relates to porous materials useful for separating and concentrating gases having a molecular weight not larger than 4, such as hydrogen and helium from a mixture of gases containing such gases, and a process for separating and concentrating such gases using such porous materials. More particularly, this invention relates to porous materials having more than 50% of fine pores falling in a specific range of pore diameter, and a process for separating the above gases in a high concentration with a high efficiency using such porous materials.

Since the oil shock in recent years, use of petroleum oil has been discouraged in most iron works, and many blast furnaces have been operated on a coke-straight base, where heavy oil blowing has been replaced by increased use of coke. As a result, so-called "iron works gases" which are given off in the course of making iron and steel in iron works increase in amount. The iron works gases have hitherto been recovered for reuse in the works, but under the recent situation, new uses of such gases must be developed.

The iron works gases include coke oven gas, converter gas and blast furnace gas. Hydrogen is a main constituent of a coke oven gas, while carbon monoxide is a useful main constituent of the converter and blast furnace gases. Carbon monoxide may be readily converted by a known process, Schift reaction, into hydrogen and carbon dioxide. Therefore, as one way of using the iron works gases for applications other than fuels, it may be concluded that if hydrogen in iron works gases or hydrogen and carbon deoxide converted by the Schift reaction can be economically separated and concentrated, the use of iron works gases can be extended into other fields such as for raw material of organic chemical syntheses. In a wider scope, separation of a particular constituent of a gas has practical importance. For instance, attention has been paid to separation of hydrogen from an off-gas exhausted from ammonia synthesis or petrochemical works and separation of helium from natural gas.

Methods for separating hydrogen or helium from mixed gases in a high concentration using porous materials or porous membranes are conventionally known. These methods utilize diffusion of hydrogen or helium molecules through tiny pores of the porous materials for separation of hydrogen or helium. This is based on the well known theory that the flow rate of a gas molecule through pores is proportional to the molecular velocity, so long as $\lambda/d \gg 1$, where $\lambda$ is the mean free path of the gas molecule and d is the pore diameter. More particularly, the flow rate of a gas through pores is reciprocally proportional to the square root of the molecular weight of the gas molecules in question. Since molecular weights of hydrogen and helium are markedly smaller than those of other gas molecules, the former gases can be separated from other gases merely by diffusion through pores. Feasibility of separation by diffusion requires the ratio $\lambda/d$ to be much larger than unity, that is in other words the pore diameter of the porous materials is much smaller than the mean free path of the gas molecules involved. To this end, a porous material having remarkably small pore diameter is needed. However, even if an ideal separation efficiency can be obtained by providing very small pore diameters, the rate of gas through the pores will be too small and the efficiency be too low for a practical separation apparatus for a commercial application. On the other hand, the mean free path of a molecule can be increased by elevating the temperature and lowering the pressure of the gas to obtain a larger value of $\lambda/d$. In this case, even an ideal separation efficiency may be obtained, the rate of gas flow through the pores is inpractically small. In fact, the separation efficiency and the permeability through pores have been generally recognized to be incompatible to each other.

So far, many investigations have been made on the separation of hydrogen by means of a porous membrane. However, an industrial apparatus for separation of practical significance has not been realized, because no separation method which is excellent in both separation efficiency and permeability has been established.

It is a general knowledge that, for separation of gases, better permeability is obtained by porous membranes than by non-porous membranes. A separation method which utilizes the above-mentioned characteristics of porous membranes and which shows excellent separation efficiency and permeability, if found, would make it possible to provide an efficient method to separate a high concentration of hydrogen or helium at a lower cost on a commercial scale from iron works gases, off-gases from chemical industries, natural gases and other unutilized gases.

2. Description of the Prior Art:

Japanese Laid-Open patent application No. Sho 55-119420, discloses use of a porous material having 20 to 200 Å pore diameters for separating concentrated hydrogen from a mixture gas containing hydrogen.

This prior art, however, teaches nothing more than a generic range of pore diameter smaller than the mean free path of hydrogen or helium molecules which can be presumed from the theory of gas separation by means of the porous material.

Thus, the prior art relates to a process for separating hydrogen for recovery from hydrogen sulfide decomposition products by using porous hollow glass or porous ceramic fibers, where a range of pore diameter of the porous materials is disclosed to be not smaller than 20 Å from the permeability of hydrogen molecules and not larger than 200 Å from the standpoint of separation from the undecomposed gases. The disclosure, however, refers only to the well-known range of pore diameter in a generic expression, and no particular technical thought which aims at a remarkable effect by using a narrow, specific range of pore diameter is observed. In fact, a porous membrane of mean pore diameter 48 Å is used in the example of the prior art, but the pore diameters are expressed only by the mean value and no description is given to the pore diameter distribution.

In addition, for separation and concentration of hydrogen, not small a number of investigations have been made by using organic high molecular porous membranes as porous materials. For example, D. F. Bradley and R. W. Baker (Polymer Engineering and Science, July 1971, Vol. 11, No. 4) estimated permeability coefficients of gases for high polymer membranes having a mean pore diameter from 20 to 120 Å, according to which the flow of the gases is the Knudsen flow for the mean pore diameter 20 Å and the Poiseuille flow for the mean pore diameter 120 Å. These results do not coincide with those obtained with the porous materials of this invention. The difference is due to difference in the nature of pores of organic high molecular thin membrane from those of inorganic material and also to difference in the methods of estimating the pore diameter distribution.

In other prior known methods of separating gases by use of porous materials, pore diameters are only disclosed in a generic expression within the scope of the gas separation theory.

SUMMARY OF THE INVENTION

The object of the present invention is to provide porous materials which can be used to separate gases having a molecular weight not larger than 4, such as hydrogen and helium in a high concentration with high efficiency from a mixture gas containing such gases.

Further object of this invention is to provide a process by which gases, such as hydrogen and helium can be separated in a high concentration from a mixture gas containing such gases.

Further object of this invention is to provide a process for separating gases, such as hydrogen and helium with high efficiency from a mixture gas containing such gases.

Further object of this invention is to separate gases, such as hydrogen and helium at a low cost from a mixture gas containing such gases for efficient utilization.

The objects of the present invention are attained by applying the porous materials and the process described below.

1. A porous material for use for separation of a gas having a molecular weight not larger than 4, such as hydrogen and helium in a high concentration from a mixture gas containing such gases, comprising not less than 50% of pores having a diameter ranging from 110 to 160 Å with respect to the total pore volume, said pore diamter being determined by nitrogen adsorption measurement.

2. A process for separating a concentrated gas having a molecular weight not larger than 4, such as hydrogen and helium from a mixture gas containing such gases, using a separation and concentration apparatus having therein two spaces with a porous material wall arranged therebetween, which comprises supplying the mixture gas into one of the two spaces and passing the mixture gas through the porous material wall to separate the concentrated gas into the other space, said porous material comprising not less than 50% of pores having a diameter ranging from 110 to 160 Å with respect to the total pore volume, said pore diameter being determined by nitrogen adsorption measurement.

DETAILED DESCRIPTION OF THE INVENTION

The present invention is based on the finding that, on separating gases having a molecular weight not larger than 4, such as hydrogen and helium with a porous material from a mixture gas containing such gases, there exists a definite range of pore diameters for porous materials which shows maximum efficiency of separating the gas in the relation between the pore diameter of porous materials and the gas separation efficiency. Therefore, this invention is directed to such porous materials as having an optimal pore diameter, and a process for concentrating and separating gases, such as hydrogen and helium with a high efficiency from a mixture gas by using such porous materials.

On investigating effects of the pore diameter distribution of porous materials on the gas separation efficiency in hydrogen or helium separation from a mixture gas, the present inventors found that the smaller diameter of pores of a porous material does not always provide the higher efficiency of separation as it is presumed by the theory of gas separation but there exists an optimal range of diameters where even rather larger pore diameters can prove a higher efficiency of separation, thus producing high performance of separation and high permeability at the same time. In this point, the present invention is entirely different from the prior arts.

DESCRIPTION OF PREFERRED EMBODIMENTS

In the following examples, the present invention will be illustrated in details. Examples of the present invention and Reference Examples are shown as demonstrating preferred examples in practising this invention. A process of concentrating and separating hydrogen using a hydrogen concentration and separation apparatus composed of a bundle of porous hollow glass tubes as porous material, as well as porous hollow glass tubes having optimal pore diameters, are explained.

EXAMPLES 1 AND 2

Figure 1:
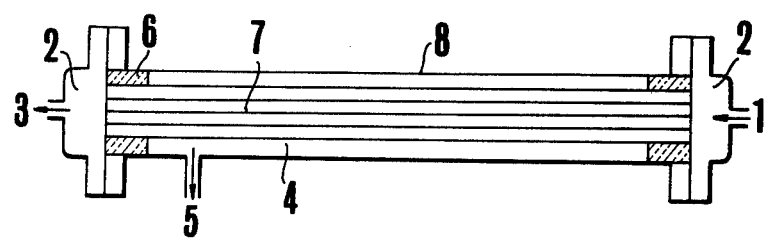
FIG. 1 schematically shows the structure of an apparatus used in Examples of the present invention and Reference Examples.

FIG. 1 shows the structure of the hydrogen concentration and separation apparatus used in this example and the reference. The bundle of porous glass tubes 7 is composed from 19 porous glass tubes, each being 5 mm in outer diameter, 0.5 mm thick and 600 mm long, and placed in a steel tube 8 of 1 inch in diameter. At each 30 mm portion of both ends of the porous glass tube bundle 7, a sealing agent 6 is applied to cover the outer surface of the porous glass tubes and to pack the gap between the bundle of porous glass tubes and the stainless steel tube. This sealing agent separates the immediate outer space 4 around the porous glass tube bundle from the spaces 2 at both axial ends of the porous glass tube bundle, with the porous glass tubes inbetween. A mixture gas containing hydrogen is forced under pressure to flow into one of the spaces 2 through the inlet 1 and to go out through the outlet 3.

On the other hand, the space 4 which immediately surrounds the porous glass tube bundle is maintained at a reduced pressure (for instance, at −700 mmHg). A concentrated hydrogen gas which has permeated through pores of the porous glass and comes into the space 4 outside the porous glass tube bundle flows out through the outlet 5.

Figure 2:
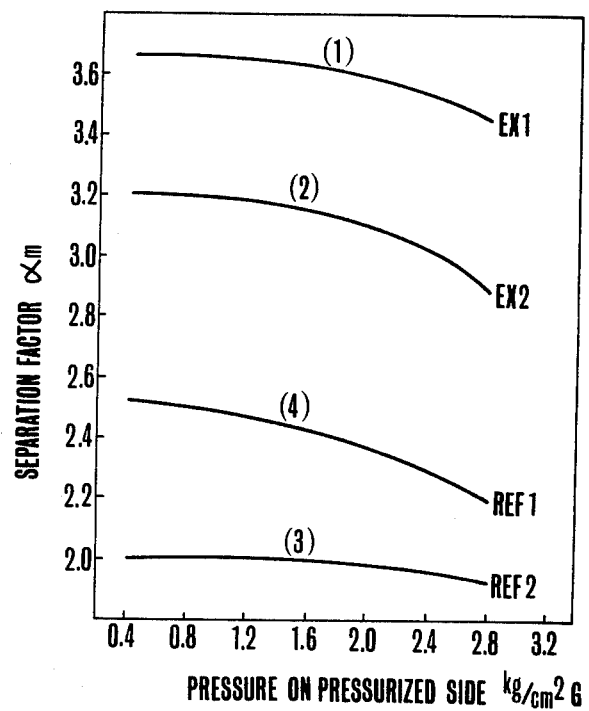
FIG. 2 shows the relationship between the pressure at the higher pressure side and the separation coefficient in Examples of the present invention and Reference Examples, where the curves 1, 2, 4 and 3 correspond to Examples 1 and 2 of the present invention, and Reference Examples 1 and 2, respectively.

Using the concentration and separation apparatus in FIG. 1, maintaining the pressure at the space 2 at a predetermined high value and at the space 4 at −700 mmHg, a mixture gas of hydrogen and carbon dioxide (1:1) was supplied to the space 2. The pressure at space 2 was varied in the range of from 0.4 to 2.8 kg/cm² G and the gas from the outlet 3 and the permeated gas from the outlet 5 were analyzed for the hydrogen concentration. Since the amount of the permeated gas increased with the increase of pressure, the amount of supplied gas was increased as the pressure was increased, thereby adjusting the amount so that the ratio in amounts of permeated gas to the depleted gas was maintained at 1:2. The separation coefficient under each condition was determined according to the expression:

$$a_m = \frac{x_p/(1 - x_p)}{(x_i + x_0)/(2 - x_i - x_0)}$$

where $x_p$, $x_i$, $x_0$ are hydrogen concentrations of the permeated gas flowing out from 5, the supplied gas coming in from 1 and the depleted gas flowing out from 3, respectively. The higher value of $a_m$ means a higher efficiency of separation. Results are shown in FIG. 2.

In Example 1, the porous glass tubes used had having a peak of pore diameters within the range of from 110 to 160 Å as determined by the method of pore distribution measurement by nitrogen adsorption. (For detailed informations reference may be made to E. P. Barrett, L. G. Joyner and P. P. Halenda, "Journal of American Chemical Society" 73 373 (1951)).

Figure 3:
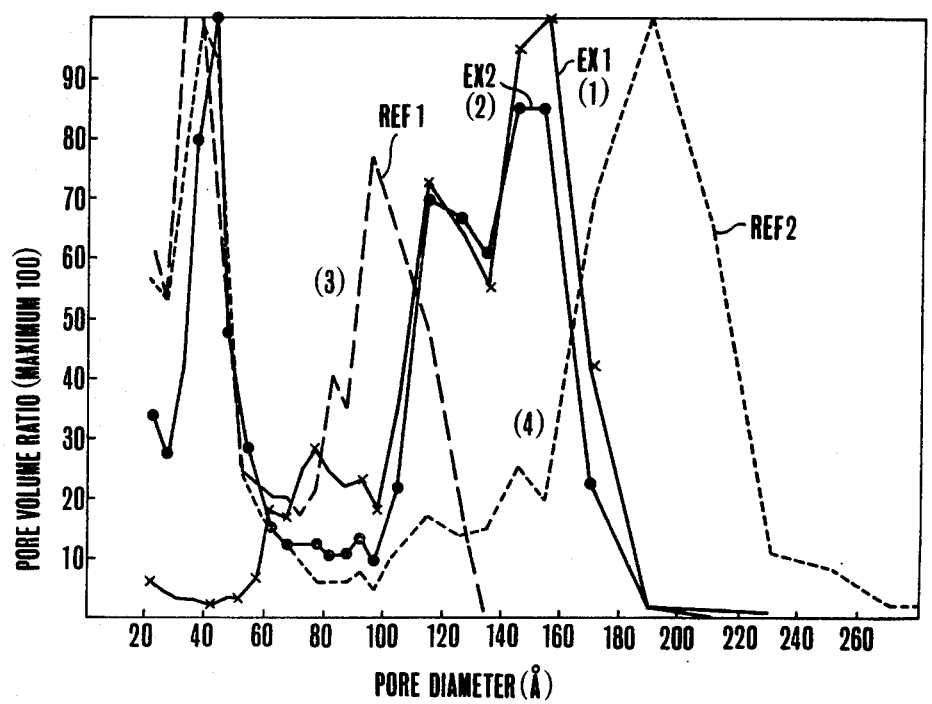
FIG. 3 shows the pore diameter distribution of porous glasses as measured by the nitrogen adsorption method, where solid lines 1 and 2 correspond to the pore diameter distribution of the porous glasses in Examples 1 and 2 of the present invention, respectively, and the broken line 3 and dotted line 4 to those in Reference Examples 1 and 2, respec- tively.

In Example 2, however, the porous glass used had two peaks of pore diameter at 30 to 50 Å and 110 to 160 Å. The porous glass used in Reference Example 1 had two peaks within the ranges of pore diameter 30 to 50 Å and 80 to 110 Å, while in Reference Example 2 two peaks were within the ranges of 30 to 50 Å and 170 to 210 Å. FIG. 3 shows the pore diameter distribution of these porous glasses. When the nitrogen adsorption is applied in determining the pore diameter distribution, results obtained from the adsorption, isotherm does not coincide generally with that obtained from the desorption isotherm. The difference is generally recognized as significant, therefore, the pore diameter distribution used in this discussion was determined from the desorption process.

The porous glass employed was prepared from a Na₂O—B₂O₃—SiO₂ glass by applying a heat treatment to cause phase splitting followed by dissolving the Na₂O—B₂O₃ phase in acid. The temperature and duration of the heat treatment and the conditions of acid pickling give influence on the pore diameters and their distribution in resultant porous glasses. Based on this fact, various porous glasses having different pore diameters and their distributions could be prepared. In Examples 1 and 2, a glass tube made from a composition of 62.5% SiO₂, 27.3% B₂O₃, 7.2% Na₂O and 3.0% Al₂O₃ was heated at 540° C. for 63 hours and acid pickled with ¼N H₂SO₄ for 40 hours in Example 1 and 20 hours in Example 2. Porous glasses, thus prepared, have usually two peaks in their pore diameter distribution.

The ratio of volume of pores having diameters ranging from 110 to 160 Å to the total volume of all pores was estimated with the porous glasses in Examples of the present invention and Reference Examples. The estimates were 57, 52, 14 and 12% for Examples 1 and 2 of the present invention, and Reference Examples 1 and 2, respectively.

The mean free path of carbon dioxide molecules is 314 to 116 Å at room temperature and under a pressure of 0.4 to 2.8 kg/cm²G. The porous glass employed in Reference Example 1 has peaks of pore diameters at 30 to 50 Å and 80 to 110 Å. These pore diameters are absolutely smaller than the mean free path of carbon dioxide molecules, but the separation coefficient obtained is minimum.

The porous glass used in Example 1 has a peak of pore diameter distribution at a pore diameters ranging from 110 to 160 Å, in Example 2 two peaks in the ranges from 30 to 50 Å and from 110 to 160 Å, and in Reference Example 2 two peaks in the ranges from 30 to 50 Å and from 170 to 210 Å. The pore diameters in these Examples are mostly not smaller than the mean free path of carbon dioxide, but the separation coefficients obtained are larger than that obtained in Reference Example 1. Among them, a maximum separation coefficient was obtained in Example 1, where the porous glass used has a peak at a pore diameters ranging from 110 to 160 Å, and the second large separation coefficient was obtained in Example 2 where peaks are in the range from 30 to 50 Å and from 110 to 160 Å. On the other hand, pore diameters larger than those in Examples make the separation coefficient fairly lower. From the above-mentioned principle of separation, the maximum efficiency of separation can be expectedly obtained from the material having the smallest pore diameters. In fact, however, Reference Example 1 where the minimum of pore diameters was applied showed the smallest value of separation coefficient.

This shows that there exists optimal pore diameters for porous glasses to concentrate and separate hydrogen. The present invention has been established on these findings.

As has been demonstrated in Examples of the present invention and Reference Examples, a higher efficiency of separation is not obtained from the smaller pore diameters of porous materials, but fairly large pore diameters are favorable for a higher efficiency of separation by a concentration and separation apparatus for hydrogen by use of a porous material. The above described facts prove that most favorable is a porous material in which the summed volume of pores having diameters 110 to 160 Å exceeds 50% of the total pore volume, and it can provide not only a high efficiency of separation but also a high level of permeability (or permeability coefficiency), and makes it possible to apply the materials for industrial uses.

In order to realize an efficient apparatus for separating concentrated hydrogen using a porous material, adjusting the conditions of operation, if necessary, as well as selection of the optimal pore diameters, is important for the concentration and separation apparatus. A particularly important point is the selection of the temperature of gas in the concentration and separation apparatus and the pressure of the permeated gas.

When a mixture gas from which hydrogen is to be concentrated and separated contains moisture, as is the case with iron works gas or denatured iron works gas, it is recommended to maintain the gas in the apparatus at a higher temperature than that of the supplied mixture gas, as will be explained with reference to the following Examples and Reference Examples.

EXAMPLES 3 TO 5

A mixture gas containing 42.1% of hydrogen, 46.0% of carbon dioxide, 7.9% of nitrogen, 2.0% of moisture and 2.0% of carbon monoxide at 20° C. was supplied to a blower where the pressure was elevated to 1.0 kg/cm²G and then introduced into a hydrogen concentration and separation apparatus as illustrated in the foregoing Example at a flow rate of 46 Nl/min. The concentration and separation apparatus consisted of a bundle of four glass tubes. A ribbon heater was wound around the outer surface of the hydrogen concentration and separation apparatus and, by applying electricity through the ribbon, the temperature of the depleted gas flowing out from the hydrogen concentration and separation apparatus was adjusted within a preset range of temperature.

Namely, the mixture gas was supplied at 20° C. to the blower, where the temperature was elevated, and cooled by heat dissipation, while the gas was passed through tubes, down to 23° to 25° C. when the gas entered the hydrogen concentration and separation apparatus. In this apparatus, the temperature of gas was either maintained or elevated with the aid of the ribbon heater.

The immediate outer space 4 of the porous glass tube bundle in the hydrogen concentration and separation apparatus was kept at a reduced pressure of −600 mmHg with a vacuum pump. While the electric current being adjusted to maintain a preset temperature of the depleted gas at the outlet of the hydrogen concentration and separation apparatus, the flow rate of the permeated gas was measured.

When an almost constant rate of the permeated gas was reached, hydrogen concentrations of the introduced mixture gas, depleted gas and the permeated gas were measured and a separation coefficient $\alpha_m$ was estimated.

The temperature of the depleted gas at the outlet of the hydrogen concentration and separation apparatus was adjusted at 35° to 40° C. in Example 3, 30° to 35° C. in Example 4, 25° to 30° C. in Example 5, and at 20° to 25° C. in Reference Example 3. Results obtained are shown in Table 1.

TABLE 1

| | Temperature of Depleted Gas at the Outlet (°C.) | Rate of Permeation of Gas (N l/min) | Separation Coefficient $\alpha_m$ |
|---|---|---|---|
| Example 3 | 35–40 | 2.4 | 3.3 |
| Example 4 | 30–35 | 2.4 | 3.3 |
| Example 5 | 25–30 | 2.2 | 3.2 |
| Reference Example 3 | 20–25 | 0.8 | 2.0 |

As seen in Table 1, higher values in both rate of permeation of gas and separation coefficient are obtained in three Examples, where the temperature of depleted gas at the outlet of the hydrogen concentration and separation apparatus was secured to be higher than that of the mixture gas supplied to the blower.

In contrast, both the rate of permeation of gas and the separation coefficient were remarkably lower in Reference Example, where the temperature of the depleted gas was the same as or slightly higher than that of the supplied mixture gas. This is because the moisture in the gas, though not saturated, can be condensed in pores on the porous glasses, thus blocking them. This fact shows that it is effective for the purpose of maintaining the temperature of gas in the concentration and separation apparatus at a higher temperature than that of supplied mixture gas.

The temperature required for the gas in the concentration and separation apparatus to be heated depends on the moisture content of the introduced mixture gas, but the temperature should be preferably by not less than 5° C., more preferably not less than 10° C., higher than the temperature where the moisture reaches saturation.

Another important factor in the operation of the concentration and separation apparatus is the pressure of gas at the permeation end. If the flow of gas through the pores is represented by "Kundsen flow", the flow of each component of gas should be proportional to the difference in the partial pressures of each component in the two spaces with the pores inbetween, or difference between the higher and lower pressures. Therefore, the larger separation coefficient can be obtained for the smaller pressure ratio, $\gamma$, or the ratio of the lower total pressure to the higher total pressure. As shown in Fig.2, however, Examples referred to the above show a decreasing tendency of separation coefficient as the applied pressure increases and therefore the pressure ratio $\gamma$ decreases.

On the other hand, if a reduced pressure is applied to the lower pressure side, markedly different separation coefficients were obtained, though the pressure ratio $\gamma$ remained constant. Effect of reduced pressure will be explained with reference to the following Examples of the present invention and Reference Examples.

EXAMPLES 6 TO 9

The hydrogen concentration and separation apparatus employed in Example 1 was used in these Examples where the space 2 at the higher pressure side was given a pressure 0.4 kg/cm²G and the space 4 at the lower pressure side was given a preset reduced pressure ranging from −338 to −602 mmHg, and a mixture gas consisting of hydrogen and carbon dioxide in a ratio of (1:1) was supplied to the space 2. Since increase of the difference in pressure between the higher and lower pressure sides was accompanied by increase of the amount of permeated gas, the amount of the supplied gas was increased with the increase of difference in pressure and was adjusted so as to keep the ratio of amounts of the permeated and depleted gases at 1:2.

On the other hand, in Reference Examples 4, 5, 6 and 7 the lower pressure side was open to the atmospheric pressure and a preset pressure ranging from 1.54 to 5.85 kg/cm²G was applied to the higher pressure side, and a mixture gas containing hydrogen and carbon dioxide in a ratio of (1:1) was supplied to the space 2. The amount of the supplied gas was adjusted to maintain the ratio of amounts of permeated and depleted gases at 1:2, as it was in Examples from 6 to 9. Separation coefficient $\alpha_m$ was estimated from the hydrogen concentrations of the supplied gas, permeated gas and depleted gas. Results are shown in Table 2.

TABLE 2

| | Lower Side Pressure (mmHg) | Higher Side Pressure (kg/cm² G) | Pressure ratio $\gamma$ | Separation Coefficient $\alpha_m$ |
|---|---|---|---|---|
| Example 6 | −602 | 0.4 | 0.15 | 3.2 |
| Example 7 | −549 | 0.4 | 0.20 | 3.0 |
| Example 8 | −444 | 0.4 | 0.30 | 2.6 |
| Example 9 | −338 | 0.4 | 0.40 | 2.2 |
| Reference | Atmospheric | 5.85 | 0.15 | 2.0 |

TABLE 2-continued

| | Lower Side Pressure (mmHg) | Higher Side Pressure (kg/cm² G) | Pressure ratio γ | Separation Coefficient $a_m$ |
|---|---|---|---|---|
| Example 4 Reference Example 5 | Atmospheric | 4.13 | 0.20 | 2.2 |
| Reference Example 6 | Atmospheric | 2.41 | 0.30 | 2.1 |
| Reference Example 7 | Atmospheric | 1.54 | 0.40 | 1.9 |

Separation coefficients obtained in Examples are markedly larger than those in Reference Examples, though same values of pressure ratio γ are given. The effect of reduced pressure is especially markable for the smaller values of the pressure ratio γ. This fact demonstrates that the pressure reduction at the permeation side (lower pressure side) is effective to obtain a high level of separation efficiency. In the hydrogen concentration and separation method of the present invention, application of a reduced pressure to the permeation side is practically most preferable.

In the above explanations, porous glass tube bundles were used as the porous material. However, porous materials other than porous glass, for example, ceramics and sintered metal powders, can provide excellent separation efficiency, so long as the optimal range of pore diameter as mentioned above is secured as illustrated by the following Examples.

EXAMPLES 10 TO 11

A 50 mm long silicon nitride tube of 10 mm in outer diameter and 8 mm in inner diameter, having pores of 1000 Å mean pore diameter was placed in a vacuum deposit compartment and deposition of aluminum was carried out under vacuum of $10^{-4}$ mmHg. The aluminum-deposited silicon nitride tube thus prepared was submitted to the pore diameter distribution measurement by nitrogen adsorption method. Results showed that the pore volume of the pores having diameters within the range from 110 to 160 Å amounted to 51% of the total pore volume. A double-wall tube was constructed with the above porous tube as inner tube and a steel tube as outer tube. A mixture gas containing hydrogen and carbon dioxide in a ratio of (1:1) was supplied with applied pressure to the inner tube, and the space between two tubes was suctioned to −700 mmHg. The separation coefficient $a_m$ was estimated. In this experiment, the amount of the supplied gas was so adjusted as to maintain the ratio of amounts of the permeated and depleted gases at 1:2. Results are shown in Table 3.

EXAMPLES 12 AND 13

A sintered nickel porous tube having pores of the mean pore diameter 4000 Å was submitted to vacuum nickel deposition in a vacuum deposition compartment at vacuum of $10^{-4}$ mmHg. Pore diameter distribution measurement of this nickel deposited sintered porous tube by the nitrogen adsorption method revealed that the integrated pore volume of those pores having diameters in the range from 110 to 160 Å amounted to 50% of the total volume of pores. Using this tube, the separation coefficient $a_m$ was estimated with a mixture gas containing hydrogen and carbon dioxide in a ratio of (1:1) in the same way as was done in Example 10. Results are shown in Table 3.

TABLE 3

| | Pressure in Inner Tube (kg/cm² G) | Ratio of Pressure γ | Separation Coefficient $a_m$ |
|---|---|---|---|
| Example 10 | 0.5 | 0.053 | 3.3 |
| Example 11 | 1.5 | 0.032 | 3.0 |
| Example 12 | 0.5 | 0.053 | 3.1 |
| Example 13 | 1.5 | 0.032 | 2.9 |

The foregoing descriptions have been made on concentration and separation only of hydrogen. However, the present invention is also useful to the concentration and separation of helium, as well as hydrogen.

What we claim:

1. Porous materials for use for separation of a gas having a molecular weight not larger than 4 in a high concentration from a mixture gas containing such gas, comprising not less than 50% of pores having a diameter ranging from 110 to 160 Å with respect to the total pore volume, said pore diamter being determined by nitrogen adsorption measurement.

2. Porous materials according to claim 1, wherein a peak in a pore diameter distribution pattern lies at least in a pore diameter range of from 110 to 160 Å.

3. Porous materials according to claim 1, wherein the materials are of glass.

4. Porous materials according to claim 1, wherein the materials are of ceramics.

5. Porous materials according to claim 1 wherein the materials are of sintered metal powders.

6. Porous materials for use for separation of hydrogen or helium in a high concentration from a mixture gas containing hydrogen or helium, comprising not less than 50% of pores having a diameter ranging from 110 to 160 Å with respect to the total pore volume, said pore diamter being determined by nitrogen adsorption measurement.

7. A process for separating a concentrated gas having a molecular weight not larger than 4 from a gaseous mixture containing such gas, using a separation and concentration apparatus having therein two spaces with a porous material wall arranged therebetween, which comprises supplying the gaseous mixture into the first of the two spaces and passing the gaseous mixture through said porous material wall to separate the concentrate gas into the second space, wherein not less than 50% of the pores in said porous material have a diameter ranging from 110 to 160 Å with respect to the total pore volume, said pore diameter being determined by nitrogen adsorption measurement.

8. A process according to claim 7, wherein the porous material has a peak of a pore diameter distribution pattern at least in a pore diameter range of from 110 to 160 Å.

9. A process according to claim 7, wherein the mixture gas in the gas separation and concentration apparatus is kept at a higher temperature than that of the mixture gas to be supplied thereinto.

10. A process according to claim 7, wherein said second space, into which the concentrated gas permeates, is kept a lower pressure than atmospheric pressure.

11. A process according to claim 7, wherein said porous material is composed of glass.

12. A process according to claim 7, wherein said porous material is composed of ceramics.

13. A process according to claim 7, wherein said porous material is composed of sintered metal powders.

14. A process according to claim 7, wherein the gas temperature in said apparatus is higher than the temperature of said gaseous mixture prior to introduction in said first space.

15. A process for separating concentrated hydrogen or helium from a gaseous mixture containing hydrogen or helium, using a separating and concentration apparatus having therein two spaces with a porous material wall arranged therebetween, which comprises supplying the mixture gas into the first of said two spaces and passing the gaseous mixture through the porous material wall to separate the concentrated hydrogen or helium into the second space, wherein not less than 50% of the pores in said porous material have a diameter ranging from 110 to 160 Å with respect to the total pore volume, said pore diameter being determined by nitrogen adsorption measurement.

16. A process according to claim 15, wherein the gas pressure of said gaseous mixture introduced into said first space is greater than the pressure prevailing in said second space.

17. A process according to claim 15, wherein the separation coefficient, defined as $$\alpha_m = \frac{x_p/(1 - x_p)}{(x_i + x_0)/(2 - x_i - x_0)}$$

wherein $x_p$, $x_i$, $x_O$ are respectively the concentrations of the gas flowing into said second space, the gaseous mixture, and the depleted gas, ranges between 2.2 and 3.3.

* * * * *